C. L. SMITH AND E. S. WEBSTER.
AIR BAG.
APPLICATION FILED AUG. 2, 1919.

1,356,173. Patented Oct. 19, 1920.

Clyde L. Smith
Emmett S. Webster
INVENTORS

By George J. Ottsch
ATTORNEY.

UNITED STATES PATENT OFFICE.

CLYDE L. SMITH AND EMMETT S. WEBSTER, OF SOUTH BEND, INDIANA, ASSIGNORS, BY MESNE ASSIGNMENTS, TO SMITH ONE HEAT SYSTEM, OF SOUTH BEND, INDIANA, A CORPORATION OF INDIANA.

AIR-BAG.

1,356,173.  Specification of Letters Patent.  Patented Oct. 19, 1920.

Application filed August 2, 1919. Serial No. 314,901

*To all whom it may concern:*

Be it known that we, CLYDE L. SMITH and EMMETT S. WEBSTER, citizens of the United States, residing at South Bend, in the county of St. Joseph and State of Indiana, have invented certain new and useful Improvements in Air-Bags, of which the following is a specification.

The invention relates to so-called air bags commonly used in the art of rubber tire making, and adapted for insertion within a tire casing or shoe and expanded by air or other fluid under pressure to force the uncured casing or shoe into firm contact with the walls of the vulcanizing mold, and so maintain the same during the vulcanizing process.

Such bags are repeatedly reused until the heat of the vulcanizing mold, and, according to the practice of some manufacturers, the heat of the fluid used to expand the bag and facilitate vulcanization of the interior walls of the casing, eventually causes the rubber and woven fabric composing the same to rapidly deteriorate and render the bag unfit for further use. The effect of the repeated exposure to high temperatures causes the rubber to harden and the fabric to lose its tensile strength and capacity to stretch, so that the bag will no longer respond to the required degree of expansion and bursts or splits under pressure, thus rendering the same unfit for further use.

It is the object of the present invention to provide a bag for the purpose stated which will have a greatly increased elasticity of its fabric component as compared with the type of bag composed of woven fabric, and its rubber component such as to yield less readily to the hardening effect of repeated exposure to high temperatures, whereby the improved bag will be comparatively more durable under like conditions of use than the bags now commonly employed in the art.

With the above and other objects in view, the invention in its preferred form of embodiment will be described in the following specification, reference being had particularly to the accompanying drawings, in which.

Figure 1:
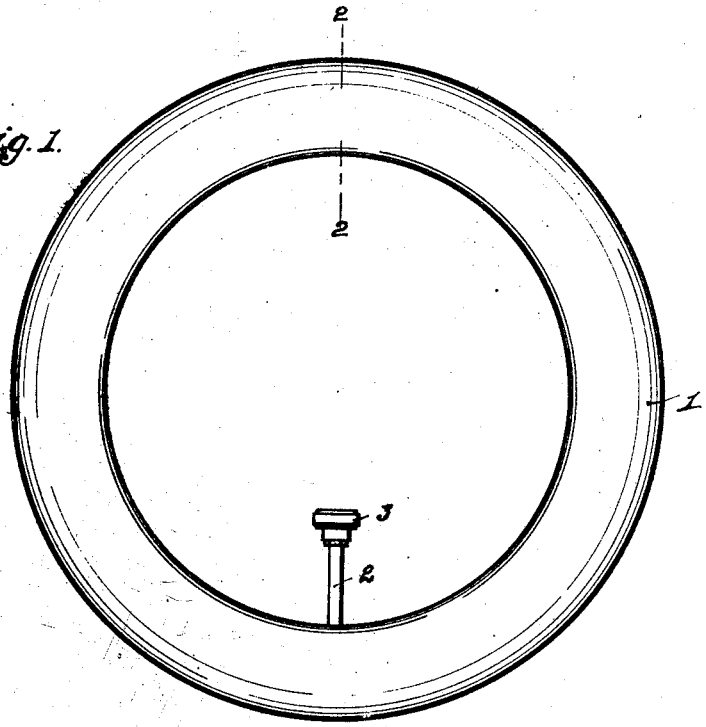
Figure 1 is a side elevation of a bag made in accordance with the invention.
Figure 2:
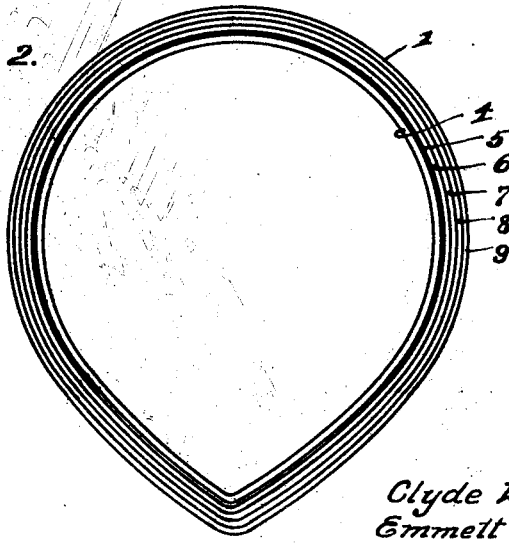
Fig. 2 is a transverse sectional view thereof taken on the line 2—2 of Fig. 1, the usual cross-hatching being omitted to obtain greater clarity of illustration.

The bag as shown consists of an annular tube 1, made up of a series of plies or laminations of different material having elastic properties which will permit the tube to expand beyond its normal size under fluid pressure from within, a pipe 2 leading within the tube and having an end union or coupling 3 permitting connection with a source of fluid under pressure.

The inner ply of the bag consists of a rubber tube 4, preferably of pure rubber sufficiently vulcanized to give the same considerable tenacity and elasticity as well, and capable of holding fluid under pressure without leakage. The outer surface of the tube 4 is coated with a rubber cement 5 for adhesively securing thereto the next ply of material 6, which consists of a knit cloth coated with, what may be termed, a non-vulcanizing rubber. Or, to be more accurate, rubber having such a small percentage of sulfur mixed therewith that the same will not vulcanize readily upon being repeatedly subjected to great heat. Another ply of knitted cloth 7 is next applied upon the like ply of material 6, and similarly coated with the so-called non-vulcanizing rubber. It is in the use of a knitted fabric or cloth coated with the non-vulcanizing or slow curing rubber that the salient feature of the present invention lies. Heretofore woven fabric has been, in so far as is known, exclusively used for the purpose, and which has a small degree of elasticity as compared with a knitted fabric. And, by coating the knitted fabric with a slow curing rubber, such elasticity of the fabric is not retarded or hindered by becoming hard long before the life of the fabric is destroyed. The bag will thus not only expand more readily, but will also resume its normal form more readily when relieved from pressure. Such not only prolongs the life of the bag, but also permits a smaller bag to be used with relation to the dimensions of the casing or shoe, with the added advantage that a smaller bag can be more handily inserted or removed from the casing or shoe than a larger bag having less expansibility. The two outer plies of the bag, as 8 and 9, also consist of knitted fabric, but are coated with a vulcanized rubber, and, with the inner rubber tube 4, form a protective envelop for the intermediate and relatively soft rubber coated fabric plies 6 and 7.

It has been found that a slow vulcanizing rubber confined between plies of other protective material prevents the rapid aging or hardening of such rubber, which aids in keeping the bag elastic and flexible, and insures a longer period of usefulness. The advantage of a knitted over a woven fabric for the purpose intended, and especially when used with the slow vulcanizing rubber in the manner set forth, produces new and highly advantageous results, in that the combination not only enhances the degree of elasticity of the bag, but permits a smaller bag to be used for the purpose. Thus the longer usefulness of the bag plus less first cost of manufacturing the same, materially reduces the cost of vulcanizing tire casings or shoes.

While the foregoing is the preferred form of our invention, it is to be understood that we do not limit ourselves to the precise structure shown and described, as it is obvious that the same may be variously modified without departing from the spirit of the invention.

What is claimed is:—

1. A bag of the character described, comprising an annular tubular member including plies of knitted fabric coated with elastic rubber.

2. A bag of the character described, comprising an annular tubular member including plies of highly elastic knitted fabric coated with elastic rubber having the property of slow deterioration of elasticity under repeated exposure to high temperatures.

In testimony whereof we affix our signatures.

CLYDE L. SMITH.
EMMETT S. WEBSTER.